Figure 1:
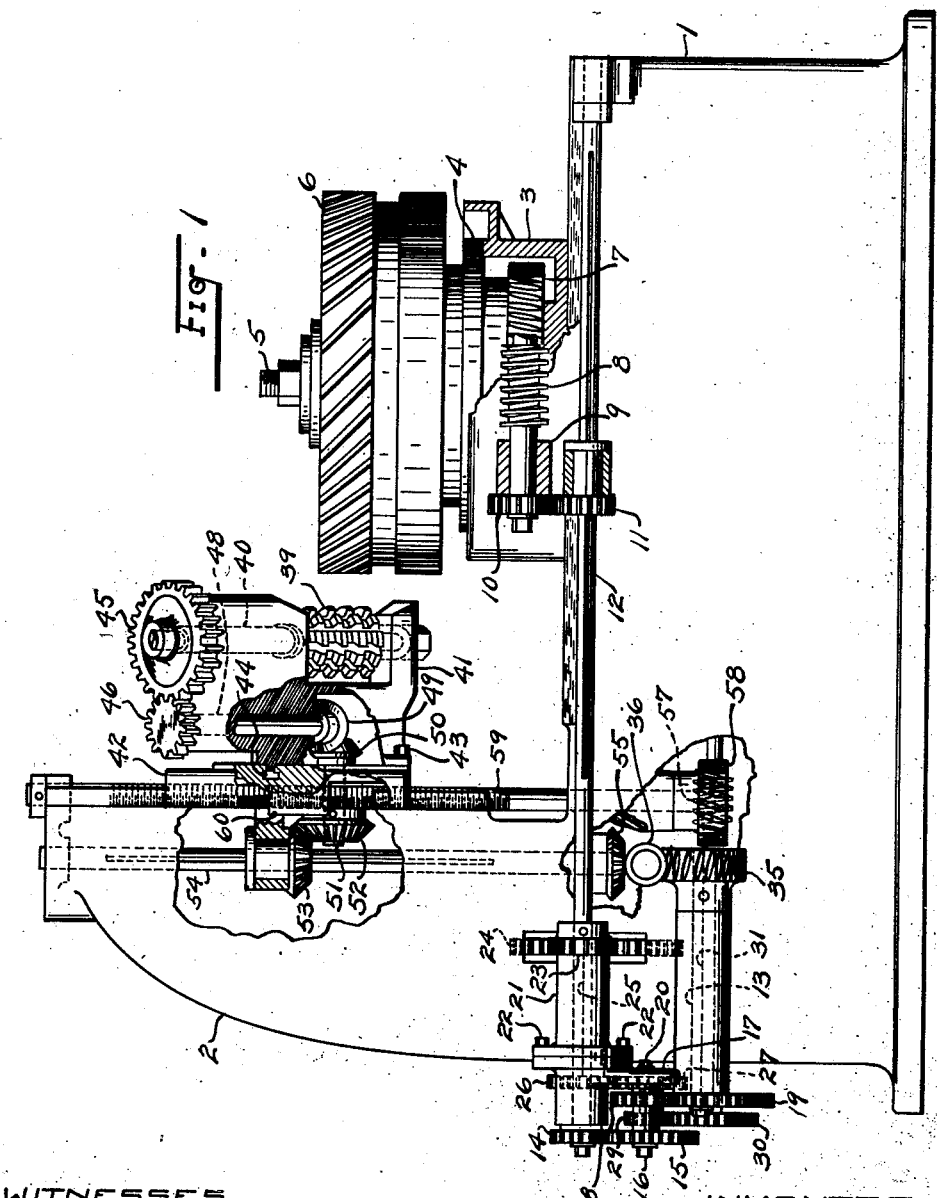

W. F. ZIMMERMANN.
PROCESS FOR CUTTING HELICAL GEAR WHEELS.
APPLICATION FILED DEC. 29, 1911.

1,037,571.

Patented Sept. 3, 1912.

2 SHEETS—SHEET 1.

WITNESSES
B. E. Barnes.
H. W. Jacobson

INVENTOR
William F. Zimmermann

W. F. ZIMMERMANN.
PROCESS FOR CUTTING HELICAL GEAR WHEELS.
APPLICATION FILED DEC. 29, 1911.
1,037,571.
Patented Sept. 3, 1912.
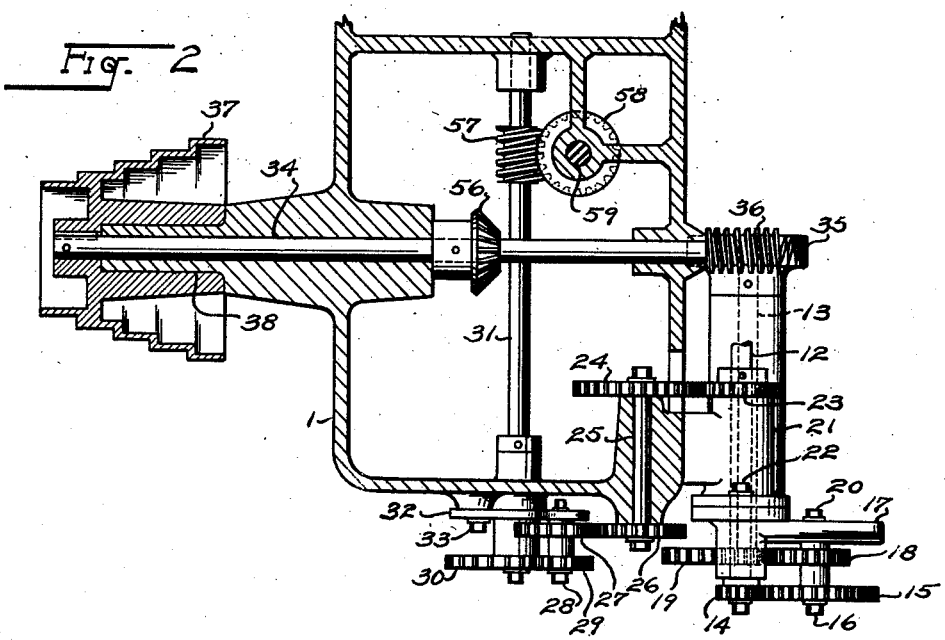
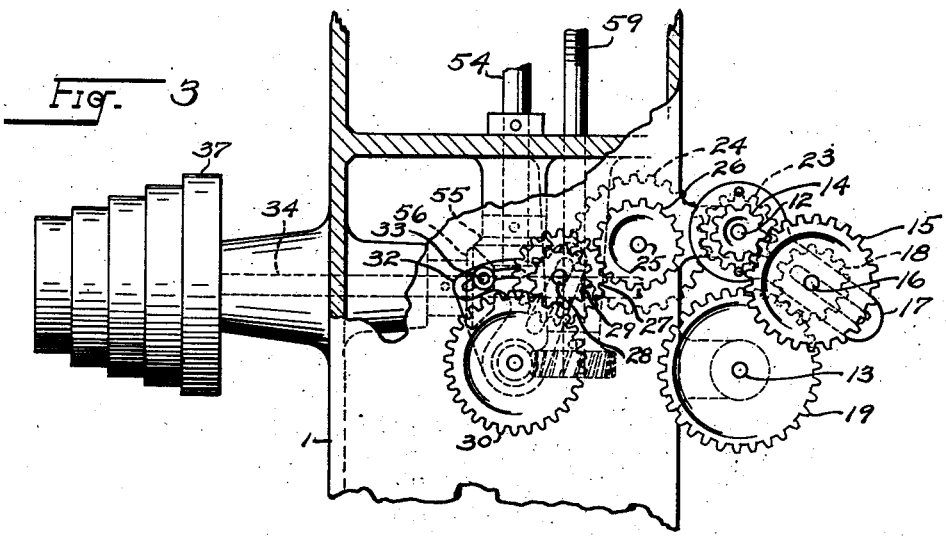
WITNESSES
B. E. Barnes.
H. W. Jacobson.
INVENTOR.
William F. Zimmermann

UNITED STATES PATENT OFFICE.

WILLIAM F. ZIMMERMANN, OF NEWARK, NEW JERSEY, ASSIGNOR TO GOULD & EBERHARDT, OF NEWARK, NEW JERSEY, A CORPORATION OF NEW JERSEY.

PROCESS FOR CUTTING HELICAL GEAR-WHEELS.

1,037,571.

Specification of Letters Patent. Patented Sept. 3, 1912.

Application filed December 29, 1911. Serial No. 668,439.

*To all whom it may concern:*

Be it known that I, WILLIAM F. ZIMMERMANN, a citizen of the United States, and a resident of Newark, in the county of Essex and State of New Jersey, have invented certain new and useful Improvements in Processes for Cutting Helical Gear-Wheels, and do hereby declare the following specification, taken in connection with the drawings forming part of the same, to be a full, clear, concise, and exact description of the invention and the best mode contemplated to apply said principle, so as to distinguish it from other inventions and to enable any person skilled in the art to which it appertains or with which it is most nearly connected to make, construct, and use the same.

This invention relates primarily to a method of generating the teeth in helical gear wheels by means of a helical or hob cutter, and employing apparatus similar to that shown and described in the co-pending application No. 657,970, filed November 1, 1911, by the applicant.

The object of this invention is to provide a process of cutting helical gear wheels with a helical cutter, by imparting a single continuous, and unbroken motion between the cutter and the work blank in a ratio that is dependent upon the number of teeth to be cut and a fixed constant, which constant is determined by the linear pitch of the gear and the approximate feed desired, and of imparting a feeding motion to said cutter and blank spindle relative to each other, parallel with the axis of said spindle, which feeding motion is dependent upon the linear pitch of the gear and said fixed constant.

The advantage of this invention resides in the practising of the process which enables more accurate gears to be readily produced than by the process described in the above co-pending application. This advantage results from the arranging of the change gears between the cutter and the work blank according to a fixed constant, to thereby establish an absolutely correct ratio between the cutter and the work blank, for the given variables, and the error, if any, will then be only present between the work blank and the feeding motion of said cutter. In the co-pending application, the feeding motion relative to the rotations of the blank spindle was absolutely exact, and the error was allowed to cumulate in the change gear ratio between the cutter and the work blank.

The objection to this method of cutting helical gear wheels is that when the error is so located, that is, between the cutter and the work blank, it is cumulative, and it requires a very high degree of accuracy in selecting the change gears, which often consumes considerable time. The cause of the cumulative error is due to the factor for the number of teeth to be cut which must be considered in addition to the other factors.

In the process of this invention, the gearing ratio between the cutter and the work blank is arranged absolutely exact in accordance with the formula herein provided, and the error is allowed to cumulate in the change gears between the work blank and the feed to the cutter. By thus allowing the error to cumulate between the work blank and the feed to the cutter, the same does not attain the proportions as would be the case when the feed was absolutely exact because the factor for the number of teeth to be cut is entirely eliminated.

By the process described in the co-pending application, the limits allowed for inaccuracy in the gearing ratio between the cutter and the work blank, as found by the proof formula therein shown, were between 1.015 and .985, whereas with the process described in this invention the allowable limit of error was set between 1.001 and .999, and it is possible to obtain a gearing ratio between the latter limits by the process of this invention with less difficulty than heretofore by any previous process.

This process has enabled the calculations for the gear ratios to be simplified to such a degree that it is possible to select all the necessary change gears with the same rapidity and accuracy as results from the use of a differential motion to cut helical gear wheels. The amount of calculation hereinbefore involved in a machine not employing a differential mechanism to cut helical gear wheels with a helical cutter has been an objection, notwithstanding the extreme simplicity and rigidity of the structure without such differential mechanism, that it has become necessary to evolve some other method of procedure.

Before describing the apparatus to practise the invention, the necessary formulæ will be derived after the following notation and general formulæ:

$P^{NC}$ = normal circular pitch of helical gear to be cut or the shortest distance between any two consecutive teeth and is measured on the normal to the helices and determines the size of the cutter to be used.

$P^{ND}$=normal diametral pitch of the helical gear and cutter.

$P^C$=circular pitch and is measured at right angles to the axis of the gear.

$P^L$=linear pitch measured parallel to the axis of the gear.

N=number of teeth in the gear.
D=pitch diameter of the gear.
D°=outside diameter of the gear.
a=addendum.
X=angle of the helices with the axis of the gear.
L=lead of the helices or the advance in one turn.

The following formulæ are ordinarily used to determine the various parts of a helical gear when the usual known quantities are given, to wit: $P^{NC}$, N and X.

$$P^{NC} = \frac{\pi}{P^{ND}} \cdot P^C = \frac{P^{NC}}{\cos X} \cdot P^L = \frac{P^{NC}}{\sin X}$$

$$D = \frac{N}{P^{ND} \cos X} = \frac{N P^{NC}}{\pi \cos X} \cdot D° = D + 2a$$

$$a = \frac{P^{NC}}{\pi} = \frac{1}{P^{ND}}$$

$$L = \frac{N P^{NC}}{\sin X} = \frac{N P^C}{\tan x} = \frac{N\pi}{P^{NC} \sin X}$$

In cutting a helical gear upon any automatic helical gear cutting machine with a helical cutter, it is always necessary to rotate the blank in unison with the helical cutter at a speed depending upon the number of teeth to be cut, while at the same time, the cutter is advanced across the face of the blank in what results in a helical path upon the peripheral face of the blank, passing around the axis of the blank, such path being due in other machines to differential gears inserted in the cutter drive or indexing mechanism. This invention produces a helical path by imparting rotary motion to the blank and cutter, in accordance with the number of teeth to be cut and a fixed constant, which constant is dependent upon the linear pitch of the gear to be cut and feed desired. The feeding motion is parallel to the axis of the gear blank and can be relative to either the rotations of the cutter or the gear blank. In this invention the feed is preferably arranged relative to the rotations of the gear blank, and the formulæ hereinafter derived are particularly adapted thereto.

To index in a machine, as will be hereinafter described, the formula for the number of teeth would be $\frac{K}{N}$, where K represents a constant depending upon the relative ratios of rotation of the work spindle to that of the helical cutter, and N represents the number of teeth to be cut.

The formulæ used in the present invention are obtained by the following derivation:

Let T equal the fixed constant derived by dividing the linear pitch $P^L$ by the required feed F. Then $$T = \frac{P^{NC}}{F \sin X} = \frac{P^L}{F}$$

And let $\frac{K}{N}$ equal the ratio required to cut spur gears, then by adding or subtracting $\frac{1}{T}$ from N, we obtain $$\frac{K}{N \mp \frac{1}{T}} = \frac{KT}{NT \mp 1} \quad \cdots \text{I}$$

which is the formula to establish the fixed ratio between the cutter and the work blank.

The formula for the feed gears would be derived by multiplying the required feed F by a constant K', which equals K'F and in which K' is a constant determined from the relative ratios of the constant gearing between the work blank and feed screw. This formula is expressed and used in terms of the fixed constant T and is derived as follows:

$$\text{Since } T = \frac{P^{NC}}{F \sin X} = \frac{P^L}{F}$$

$$\text{Then } F = \frac{P^{NC}}{T \sin X} = \frac{P^L}{T}$$

Substituting the value of F in K'F we obtain $$K'F = \frac{K'P^L}{T} = \frac{K'P^{NC}}{T \sin X} = \text{II}$$

To obtain a proof formula whereby it may be ascertained whether the gears selected according to formula II will be within the limits herein before described, it is only necessary to divide the formula II by the gearing ratio used, thus letting R equal the ratio of gears used then $$\frac{K P^{NC}}{T \sin X} \div R = \frac{K P^{NC}}{R T \sin X} = 1$$

The digit 1 resulting from the proof formula expresses the extra rotation or the approximation required for the lead of the helical gear.

In practising this invention a chart is compiled containing the fixed constants T for the various conditions met with in ordinary practice. It then only becomes necessary to consult the table of factors T and substitute the other known quantities to find the gearing ratio. Furthermore this process has enabled the gearing ratios, as expressed by formulæ I and II, for the numerous conditions, to be readily put in chart form, and thus eliminate calculation entirely. This was impossible with the process described in the co-pending application without the expenditure of months, if not years of labor and at considerable expense.

The annexed drawings and description set forth in detail certain contrivances embodying means constituting, however, but one of the various mechanical forms in which the principle of the invention may be used.

The novelty of the invention will be readily understood from the drawings, which show a construction for practising the invention in its preferred form, and from the following description thereof, and is more particularly pointed out and distinctly claimed in the claims annexed to said description.

In the drawings: Figure 1 is a side view of an apparatus embodying the features necessary to produce helical gear wheels with a helical cutter in accordance with this invention. Fig. 2 is a sectional plan view through a constant driving train for the cutter and work blank. Fig. 3 is a partial rear elevation in section to exhibit the driving mechanism.

Proceeding now with the detailed description of the mechanism to practise the invention, the main frame I is provided with a stanchion 2 at one end thereof, preferably cast integral therewith. A work slide 3 is adjustably mounted on the horizontal portion of the main frame I and is provided with a revoluble work spindle 4 therein, in which the work arbor 5 is secured, whereby the gear blank 6 may be centered and secured to the spindle 4 in the usual way. A worm or index wheel 7 is secured to the lower end of the work spindle 4 and is rotated by the worm 8 in engagement therewith. The indexing worm 8 is mounted in bearings 9 of the work slide 3 and is provided with a gear 10 secured to one end thereof, to engage with the gear 11 which is slidably keyed to the index shaft 12. The index shaft 12 extends along the side of the main frame and is mounted in bearings at either end thereof and connected to the indexing drive shaft 13, by means of a compound train of change wheels which are arranged in accordance with the formula hereinbefore described.

The change gear 14, secured to the index shaft 12 meshes with a second change gear 15 rotatably mounted on the stud 16, carried by the arm 17. A third change gear 18, also rotatably mounted on the stud 16, is arranged to rotate in unison with said second change gear 15 and meshes with the change gear 19 secured to, and rotatable with the index shaft 13. The stud 16 is slidably arranged in the arm 17 to accommodate the various diameter change gears, and is secured to said arm by a bolt 20. The arm 17 carrying the stud 16 is pivotally mounted upon the index shaft 12 and is secured in the various positions to the indexing shaft bearing 21 by means of the bolts 22. The index shaft 13 has secured thereto and rotatable therewith, a feed driving gear 23 which meshes with a gear 24 secured to the feed drive shaft 25. A change gear 26, is secured to the other end of said feed drive shaft 25 and engages with the change gear 27, rotatably mounted on the stud 28. The change gear 29, also rotatably mounted on said stud 28, is arranged to rotate the change gear 30 secured to the worm shaft 31, to drive the feed to the helical cutter as hereinafter described. The stud 28 is slidably arranged in the arm 32 to accommodate the various diameter change gears and is pivotally mounted upon the feed worm shaft 31. Said arm 32 can be secured to the frame in any of its pivotal positions by the bolt 33.

The index shaft 12 which imparts motion directly to the gear blank receives its motion, from the main shaft 34, through the worm wheel 35 secured to the index drive shaft 13 and rotated by the worm 36 secured to and rotatable with said main shaft 34. The ratio of the worm wheel 32 and the worm 36 must be equal to or a factor of the ratio between the main drive shaft 34 and the helical cutter, preferably the former, so that for each rotation of the cutter, the index drive shaft 13 will make a complete rotation or a multiple thereof. Any other relations may, however, be established between the cutter and the work blank so as to result in some convenient factor which can be used in the formula without difficulty in factoring.

The main drive shaft 34 is rotated by the cone pulley 37 which is mounted on the hub 38 of the main frame I. The helical cutter 39 is secured in any suitable manner to the cutter shaft 40 mounted to rotate in the swivel carriage 41. The carriage 42 on which the swivel carriage 41 is mounted, is vertically adjustable on the stanchion 2, parallel to the axis of the gear blank. The swivel carriage 41 is secured to the cutter carriage 42 in any angular position in relation to the gear blank, by means of bolts 43, the heads of which are in engagement with the circular T slot 44, arranged in said cutter carriage 42. The cutter shaft 40 has secured thereto, and rotatable therewith, a drive gear 45, meshing with the pinion 46, which is secured to the shaft 48, also rotatably mounted in the swivel carriage 41. On the other end of the pinion shaft 48, a bevel gear 49 is secured, engaging with a bevel gear 50, which is secured to the center shaft 51, about which the swivel carriage 41 pivots. By pivoting the helical cutter about the center shaft 51, a rotatable connection through the bevel gears 50 and 49 is insured in any angular position of the cutter. A bevel gear 52 is secured to the other end of the shaft 51, and meshes with the bevel gear 53, which is rotatably mounted in the cutter carriage and is slidably keyed to rotate with the vertical cutter shaft 54. The cutter drive shaft 54 is mounted in bearings provided in the stanchion 2. A bevel gear 35 is secured to the lower end of said cutter drive shaft 54 and engages with a bevel gear 56 which is secured to and rotatable with the main shaft 34. The feed of the cutter parallel to the axis of the gear blank is obtained from the index shaft 12 through the gears 23 and 24, and change gears 26, 27, 29 and 30 as hereinbefore described. From this connection it is obvious that the feeding motion of the cutter is dependent upon and relative to the rotations of the blank spindle. The feed worm shaft 31 is provided with a feed worm 57 preferably integral therewith, which engages with the feed worm wheel 58, secured to the cutter feed screw 59. Said feed screw 59 is mounted in bearings of the main frame and engages a threaded portion 60 of the cutter carriage 42 and is rotated through the worm and worm wheel 57 and 58 and change gear connections hereinbefore described.

From the construction as described it will be seen that rotary motion is transmitted directly from the main shaft to the gear blank and from the main shaft to the cutter, but it is not necessary that the cutter and the work blank be independent branches from the same source of motion. It is merely essential for this invention that there be a continuous and unbroken line of motion between the cutter and the work blank. The feeding motion is obtained from the index shaft which rotates in synchronism with the blank spindle, and the feeding motion of the cutter is therefore controlled and dependent upon the rotations of the blank spindle. Compound feed change gears have been introduced in the feed train to facilitate the arranging of the feed change gears.

Having described my invention, I claim and desire to secure by Letters Patent:

1. The process for cutting the teeth of helical gear wheels, that have a directrix coinciding with the gear blank axis, consisting of rotating a helical cutter, and imparting rotary motion to a gear blank relative to said cutter through a single continuous unvarying motion from a driver to said cutter and gear blank, respectively, the relative rotations of the cutter and gear blank being dependent upon the number of teeth to be cut in the gear blank, and a constant derived as described, and of feeding said cutter relative to the rotations and parallel with the axis of said gear blank in a ratio dependent upon the linear pitch of the gear blank and said constant.

2. The process for cutting the teeth of helical gear wheels that have a directrix coinciding with the gear blank axis, consisting of imparting a single continuous and unvarying rotary motion between a helical cutter and gear blank from a driver to said cutter and gear blank, respectively, in a ratio dependent upon the number of teeth to be cut and a fixed constant, and of feeding said cutter and blank relative to each other, parallel to the axis of said blank and relative to the rotations of said single continuous and unvarying rotary motion in a ratio dependent upon the linear pitch of the gear blank and said fixed constant.

3. The process for cutting the teeth of helical gear wheels that have a directrix coinciding with the gear blank axis, consisting of imparting a single continuous and unvarying rotary motion between a helical cutter and gear blank from a driver to said cutter and gear blank, respectively, in a ratio dependent upon the number of teeth to be cut in the blank, minus the reciprocal of a fixed constant, and of feeding said cutter relative to said single continuous and unvarying rotary motion in a ratio dependent upon the linear pitch of the gear blank divided by said fixed constant.

4. The process for cutting the teeth of helical gear wheels that have a directrix coinciding with the gear blank axis, consisting of rotating a helical cutter, and imparting rotary motion to a gear blank relative to said cutter through a single continuous unvarying motion from a driver to said blank and cutter, respectively, said relative rotations being dependent upon the ratio of the intermediate gearing multiplied by a fixed constant and the product divided by the product of the number of teeth to be cut by said constant, minus one, and of feeding said cutter relative to the rotations and parallel to the axis of said gear blank in a ratio dependent upon the ratio of the intermediate gearing multiplied by the normal circular pitch of the gear, and the product divided by said fixed constant multiplied by the sine of the angle of the helical teeth to be produced.

WILLIAM F. ZIMMERMANN.

Witnesses:
H. W. JACOBSON,
B. E. BARNES.